(12) United States Patent
Niebergall et al.

(10) Patent No.: US 9,003,034 B2
(45) Date of Patent: Apr. 7, 2015

(54) METHOD FOR OPERATING A LOCAL AREA DATA NETWORK

(75) Inventors: Michael Niebergall, Munich (DE); Steffen Rusitschka, Munich (DE); Alan Southall, Munich (DE); Sebnem Rusitschka, Munich (DE)

(73) Assignee: Unify GmbH & Co. KG, Munich (DE)

(*) Notice: Subject to any disclaimer, the term of this patent is extended or adjusted under 35 U.S.C. 154(b) by 1839 days.

(21) Appl. No.: 12/309,546

(22) PCT Filed: Jul. 23, 2007

(86) PCT No.: PCT/EP2007/057586
§ 371 (c)(1),
(2), (4) Date: Aug. 9, 2012

(87) PCT Pub. No.: WO2008/012291
PCT Pub. Date: Jan. 31, 2008

(65) Prior Publication Data
US 2012/0331143 A1    Dec. 27, 2012

(30) Foreign Application Priority Data

Jul. 24, 2006 (DE) .......................... 10 2006 034 155
Nov. 7, 2006 (DE) .......................... 10 2006 052 451

(51) Int. Cl.
*G06F 15/173* (2006.01)
*H04L 12/911* (2013.01)
(Continued)

(52) U.S. Cl.
CPC .............. *H04L 47/783* (2013.01); *H04L 67/10* (2013.01); *H04L 67/1065* (2013.01); *H04L 61/1582* (2013.01)

(58) Field of Classification Search
CPC . H04L 67/10; H04L 67/1065; H04L 61/1582; H04L 45/02; H04L 45/42; G06F 9/50; G06F 9/5061; H04Q 2011/0086

USPC .......................... 709/223–226, 238, 243–244
See application file for complete search history.

(56) References Cited

U.S. PATENT DOCUMENTS 6,130,875 A *  10/2000  Doshi et al. .................... 709/224
7,936,768 B2 *   5/2011  Rusitschka et al. ........... 370/400
(Continued)

OTHER PUBLICATIONS

Cai, M., "A Peer-to-Peer Replica Location Service Based on a Distributed Hash Table", Supercomputing, 2004. Proceedings of the ACM/IEEE SC2004 Conference, IEEE, 2004, pp. 243-254 (handwritten by the examining body pages), ISBN 0-7695-2153-3.

(Continued)

*Primary Examiner* — Bharat N Barot
(74) *Attorney, Agent, or Firm* — Buchanan Ingersoll & Rooney PC

(57) ABSTRACT

A method for operating a local area data network with a plurality of network nodes is disclosed, wherein the network nodes send requests to the data network using request values and each of the network nodes has an associated explicit identifier from a key space. A plurality of network nodes respectively has an associated one or more table entries in a value table distributed over the network nodes. In this case each table entry includes a request value having data associated with the key space and with the request value, the network node being responsible for a request value whose identifier is less than or equal to the request value. For the plurality of network nodes, the frequency with which requests for the request values associated with a respective network node are sent to the respective network node is respectively monitored. If it occurs that the frequency of the requests for one or more request values to a respective network node exceeds a predetermined threshold value then at least the table entry or entries for this or these request values are assigned to at least one other network node which is situated in a request path for the request.

20 Claims, 4 Drawing Sheets

(51) Int. Cl.
*H04L 29/08* (2006.01)
*H04L 29/12* (2006.01)

(56) References Cited

U.S. PATENT DOCUMENTS

| | | | | |
|---|---|---|---|---|
| 8,204,879 | B2 * | 6/2012 | Doyle | 707/727 |
| 8,423,663 | B2 * | 4/2013 | Archer et al. | 709/238 |
| 8,495,130 | B2 * | 7/2013 | Maenpaa et al. | 709/238 |
| 8,832,234 | B1 * | 9/2014 | Brooker et al. | 709/223 |
| 2013/0290223 | A1 * | 10/2013 | Chapelle et al. | 706/12 |
| 2014/0047342 | A1 * | 2/2014 | Breternitz et al. | 709/226 |

OTHER PUBLICATIONS

Gopalakrishnan, V., "Adaptive Replication in Peer-to-Peer System", Proceedings—24th International Conference on Distributed Computing Systems, IEEE, 2004, pp. 360-369 (handwritten by the examining body pages).

Lua, E. K., "A Survey and Comparison of Peer-to-Peer Overlay Network Schemes", IEEE Commnications Survey & Tutorials, Second Quarter 2005, pp. 72-93.

Binzenhöfer, A. et al., "A Scalable Alghorithm to Monitor Chord-based P2P Systems at Runtime", Parallel and Distributed Processing Symposium, 2006, 20th International Rhodes Island, Greece, Apr. 25-29, 2006, pp. 1-8; Magazine.

Bosneag, A. et al., "Adaptive Congestion Control for Hotspot Management in Structured Peer-to-Peer Systems", Cluster Computing and the Grid, 2004, IEEE International Symposium on Chicago, IL, USA, Apr. 19-22, 2004, Piscataway, NJ, USA, pp. 82-89; Magazine.

Wongrujira, K. et al.,"Incentive Service Model for P2P", Computer Systems and Applications, 2005. The 3rd ACS/IEEE International Conference, Cairo, Egypt, Jan. 3-6, 2005, Piscataway, NJ, pp. 433-439; Magazine.

* cited by examiner

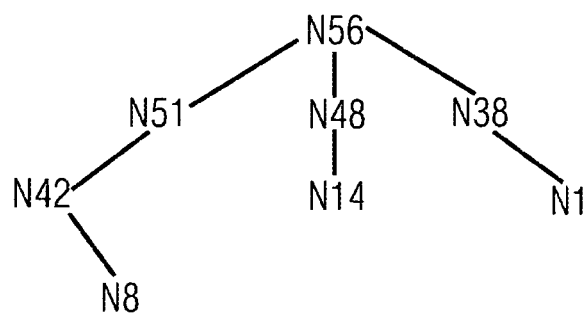
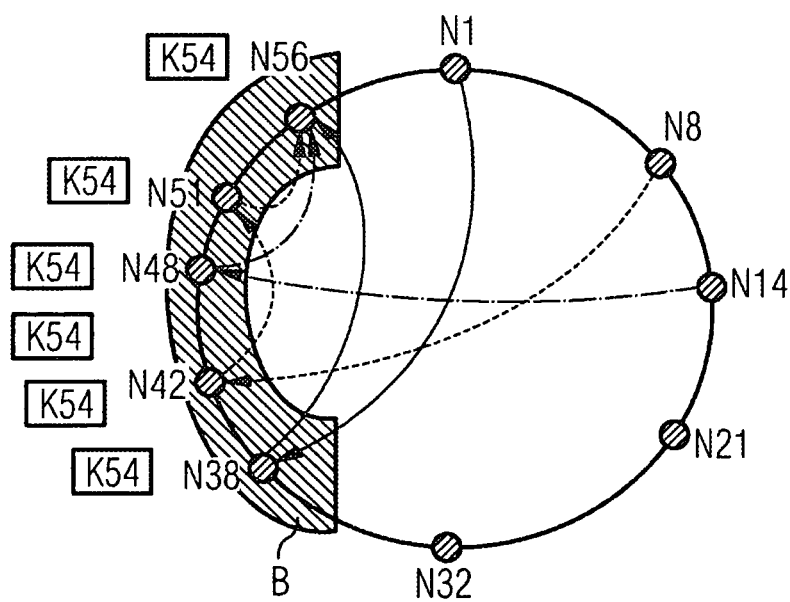

METHOD FOR OPERATING A LOCAL AREA DATA NETWORK

CROSS REFERENCE TO RELATED APPLICATIONS

This application is the US National Stage of International Application No. PCT/EP2007/057586 filed Jul. 23, 2007 and claims the benefit thereof. The International Application claims the benefits of German application No. 10 2006 034 155.4 DE filed Jul. 24, 2006 and German application No. 10 2006 052 451.9 filed Nov. 7, 2006, all of the applications are incorporated by reference herein in their entirety.

FIELD OF INVENTION

The invention relates to a method for operating a decentralized data network comprising a plurality of network nodes, in which the network nodes are able to direct requests to the data network with the aid of checking values.

BACKGROUND OF INVENTION

In decentralized networks, for example peer to peer overlay networks based on a distributed hash table, resources are distributed to the individual network nodes in a decentralized manner. It is possible in this process for each individual network node to search for corresponding resources with the aid of keywords. Checking values are used for this purpose, with a unique checking value being generated from a keyword. The checking values are managed by the network nodes, with each network node being responsible for predetermined checking values. Each of the network nodes is allocated a unique identifier from a key space. This can be a binary key space for example with a width of n bits. The checking values, which are likewise formed for example from the key space with a width of n bits, are used by network nodes to direct search requests for example into the network. A network node can also send so-called publication requests for a specific checking value to the network node responsible for the specific checking value. The transmitting network node uses such publication requests to give notice that it wishes to publish, in other words make available to the other network nodes, resources, which are assigned to the specific checking value and as a result to the corresponding keyword, in the network.

The checking values are for example hash values, which are generated using a hash algorithm. The checking values are preferably stored in a table, with each table entry containing a corresponding checking value and data assigned to this checking value, for example a reference to the storage location of corresponding resources.

This data is associated here with the keyword, from which the checking value was generated. The table is preferably distributed in a decentralized manner in the data network, with each network node being responsible for a value range in the table.

The instance can now occur that specific resources, in other words specific checking values, are requested, in particular searched for and/or published, particularly often by means of corresponding requests in the network. This results in overloading of the network nodes responsible for the corresponding checking values. Such network nodes are also referred to as hot spots. When a hot spot is overloaded, it can cause blocking and failure of said network node. As a result the network traffic in the region of this hot spot increases, endangering the stability of the network as a whole. The network also loses capacity.

To resolve the hot spot problem, it is known from the prior art that particularly popular data can be replicated to one or more network nodes. For example the popular data, for which a corresponding network node is responsible, can be replicated directly to adjacent nodes. Replication to any other network nodes, for example those specified by algorithms, is also possible however. However data replication poses the problem that it must always be ensured in the network that the replicated copies are up to date. This requires further specific mechanisms.

It is also known that a further logical network can be provided for the data network, to organize the requests in the network. This has the disadvantage that so-called "keep alive" messages are required, with the result that a relatively extensive transmission capacity bandwidth is taken up by the further logical network alone. It is furthermore necessary to manage connections, using the existing table that is distributed in a decentralized manner in the data network.

SUMMARY OF INVENTION

No methods are known from the prior art, which can resolve the hot spot problem in a satisfactory manner.

An object of the invention is therefore to create a method for operating a decentralized network, in which it is possible to avoid overloading a network node due to too many requests in a simple and effective manner.

This object is achieved by the independent claims. Developments of the invention are defined in the dependent claims.

With the inventive method a number of network nodes are respectively allocated one or more table entries from a value table distributed to the network nodes, with each table entry comprising a checking value from the key space and data assigned to the checking value, with the network node being responsible for a checking value, whose identifier is less than or equal to the checking value. The value table here is preferably the distributed hash table mentioned in the introduction, with the checking values in the hash table representing hash values. It is preferably ensured that one or more keywords is/are assigned uniquely to a checking value, which can be achieved when using a distributed hash table with a hash algorithm, for example SHA1. The hash value allows assignment of a table entry to a specific network node. The data assigned to a checking value is for example resources, in particular files, or references to storage locations of resources in the data network.

The inventive method monitors for the number of network nodes to determine the frequency with which requests for the checking values allocated to the respective network node are directed to the respective network node. Requests here are understood in particular to be the search and/or publication requests mentioned in the introduction. The method is characterized in that, if the frequency of requests for one or more checking values exceeds a predetermined threshold value at a respective network node, at least the table entry or entries of this or these checking values is/are allocated to another network node, which is located in a request path for the request.

Such monitoring and allocation of a frequently requested checking value to another network node allows overloading of the network node responsible for a request value to be avoided in an effective manner. The threshold value here can be selected according to the requirements and size of the data network; for example the threshold value can be determined heuristically. With the inventive method the checking values are distributed along a request path to the smallest possible extent, with the result that the outlay for managing the checking value can be distributed and search requests can be completed more quickly. The request path, which is followed for both publication requests and search requests, here preferably comprises those network nodes, which are contacted by the publishing or searching network node when a request is sent into the data network.

When a request is directed into the data network by one of the network nodes, one or more steps is/are executed until the responsible network node is reached, with each step comprising a request from one of the network nodes to another of the network nodes and with the number of steps until the responsible network node is reached representing the request path. This allows the distribution of popular resources during publication, so that search requests for a specific checking value can be dealt with by a number of the network nodes.

According to one advantageous embodiment, when a table entry is allocated to the distributed value table by a publishing network node, the table entry is routed by way of the request path to the responsible network node, with, if it is found that the frequency of checking values exceeds the predetermined threshold value at the responsible network node, the table entry being allocated to one of the network nodes, which is arranged upstream of the responsible network node in the request path. In order to be able to reduce the load of the network node, which is responsible for managing a specific, popular checking value, distribution during a publication request is determined by the publishing network node. The checking value is hereby allocated to those network nodes the publishing network node has contacted when passing along the request path. The process is thus referred to as back propagation, as such network nodes are "behind" in the request path or more precisely the publication path from the point of view of the responsible network node. This keeps the management outlay for back propagation reasonable even in dynamic instances. The more frequently a resource, i.e. a checking value, is published, the more network nodes share the storage load. Also back propagation on the request paths forms a cache for a faster response to search requests and thus the load in the network for response purposes.

According to a further advantageous embodiment copies of one or more table entries to be allocated are stored along the request path. Caches are thus formed along the request path, containing copies of the searched for checking values. This allows the search paths for a specific checking value to be shortened, the more popular the checking value. Also the load of search requests is borne by a number of the network nodes, the more popular a searched for checking value.

In a further embodiment the network node publishing a table entry stores a respective identifier of the network nodes in the request path until the responsible network node is reached. This means that when a table entry is published, no additional information is required from network nodes other than the publishing network node. This allows additional management outlay to be avoided for other network nodes during back propagation.

According to a further embodiment the network node publishing a table entry stores the number of steps required in the request path until the network node to which the table entry is allocated is reached. The publishing network node hereby stores the information indicating the number of steps (also referred to as hops) required in the request path until the responsible network for storing the table entry was found.

In a further embodiment provision is made for a period of validity to be determined for each of the table entries in the value table, with the table entry being deleted from the table after the period of validity has expired and with the table entry being allocated once again to the network node in question or another of the network nodes to maintain the table entry on one of the network nodes.

Allocation preferably involves the publishing network node passing through the network nodes located in the request path in the direction of the network node responsible for the table entry step by step, until the determined steps, plus a number of further steps, are reached. The number of further steps is preferably one.

In another embodiment provision is made for a period of validity to be specified for each of the table entries in the value table, with the table entry being deleted from the value table after the period of validity has expired and with the table entry being copied or moved by one of the network nodes that does not have the table entry from a network node with the table entry in the request path, said network node being arranged upstream of the network node in the request path, to maintain the table entry.

In a development of this variant, the network node copying the table entry is arranged in the request path adjacent to the network node to which the table entry is allocated.

Due to the fact that network nodes can fail, a specific period of validity, also referred to as lease time, is defined for each table entry. The period of validity ensures that a table entry is removed from the data network again after this period of validity has expired. If a table entry is still to be able to be found in the data network after the period of validity has expired, the table entry must be re-published. This can result in so-called holes on the request path. Holes are preferably points in the request path, where the network nodes have not yet reached the specific threshold value for a specific checking value. These are generally those network nodes which are further forward on the request path from the point of view of the publishing network node and already manage table values with the checking value. If we assume that all the table values propagated to avoid hot spots have the same period of validity in each instance, the periods of validity of the checking values close to the network node that is actually responsible for the table entry expire earlier than those propagated along the checking path in the course of time.

To resolve this problem the inventive method provides two methodologies that can be deployed as alternatives. In the first of the methods described above the publishing network node counts the steps required to reach the network node, to which the checking value is allocated. The table entry is re-published after the same number of steps. If the network node in question has reached its predetermined threshold value, the table entry is propagated a number of further steps, preferably one, toward the destination (i.e. on the request path in the direction of the responsible network node). Each of the publishing network nodes thus fills up any resulting holes independently.

In the other alternative a tree structure is formed through the back propagation of the table entries. In this process the network nodes try to maintain the tree structure independently. For this each network node in the tree requires information about "child nodes". "Child nodes" are those nodes on the request path in front of it, in other words in the direction of the publishing network node. This information can be provided for example by the publishing network nodes. If the period of validity of a table entry expires, the table entry is re-published, on the first suitable network node on the request path, which has not yet reached its threshold value for this table entry or checking value. If the period of validity of the table entry expires on one of the network nodes storing it, this network node makes a request to its "child nodes" in the tree for the table entry with the relevant checking value and copies or moves it toward itself. This allows holes to be filled up automatically.

As well as the method described above, the invention also relates to a decentralized data network comprising a plurality of network nodes, the data network being embodied in such a manner that a method as claimed in one of the preceding claims can be implemented. The data network is for example a computer network, in which the network nodes comprise one or more computers, in particular a peer to peer network, for example in the form of a chord ring.

BRIEF DESCRIPTION OF THE DRAWINGS

The invention is described in more detail below with reference to exemplary embodiments in the accompanying figures, in which:

FIG. 5B shows a diagram of the tree structure resulting from the search requests in the data network according to FIG. 5A, and FIG. 6 shows a schematic diagram of the data network from FIG. 1, illustrating characteristics of the data network, which are utilized by the invention.

DETAILED DESCRIPTION OF INVENTION

Figure 1:
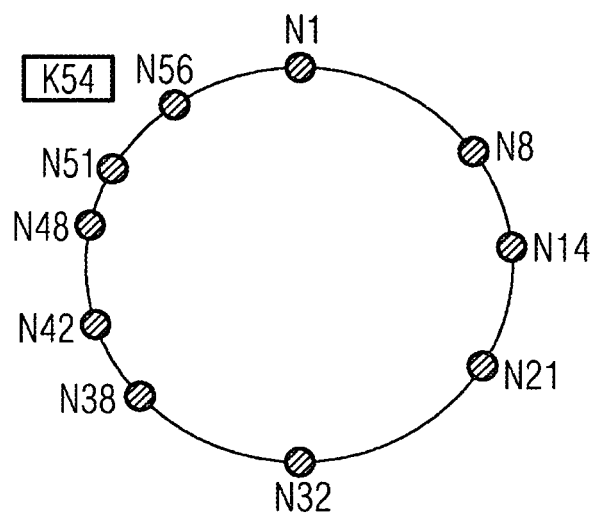
FIG. 1 shows a schematic diagram of a peer to peer network based on a distributed hash table, in which the inventive method can be deployed.

FIG. 1 shows a data network with a number of network nodes N1, N8, N14, N21, N32, N38, N42, N51 and N56, which is suitable for storing and managing a distributed hash table. The use of distributed hash tables allows the realization of scalable peer to peer networks, in which it can be guaranteed that each network node, also referred to as a peer, can find any information published in the data network. In order to be able to ensure the scalability of the data network, it is generally necessary for a peer only to know a subset of the overall topology of the data network. The individual network nodes of this subset are referred to as fingers.

An identifier from a binary key space, which is for example n=160 bits in size, is allocated to each of the network nodes wishing to be part of a data network structured as a distributed hash table. One or more keys or identifiers is likewise allocated to the information that can be exchanged in the peer to peer data network, hereafter referred to as resources and stored in the hash table as table entries.

The identifiers or keys or the resources are generated dynamically during publication and based on specific search information. Publication here is understood to mean that one of the network nodes wishes to create a resource in the distributed hash table. To this end the resource must be allocated to one of the network nodes of the data network and be managed by it. To create the identifier of a resource, keywords, which describe the resources, are hashed. These hash values serve as identifiers and at the same time determine which network node(s) is/are responsible for managing the resource in the data network. The network node responsible for a resource is the one whose identifier is less than or equal to the checking value, therefore the hashed keyword of the table entry. Also the resource is identified uniquely in the data network by the checking value. This is also commonly referred to by those skilled in the art as the fingerprint. It can for example be the hash value generated by hashing the overall content of the resource.

For the purposes of illustration in the exemplary embodiment which follows the configuration of a distributed hash table according to the peer to peer protocol chord is described. In the protocol chord the network nodes obtain identifiers from a 160-bit key space and are arranged virtually in a ring, as shown in FIGS. 1 to 5A and 6. The fingers of a network node are distributed logarithmically over the ring here. This means that each network node knows the network node whose identifier is the next smallest identifier to the hash value $(ID+2^i \mod 2^{160})$ for all i=1, ..., 160. FIG. 1 shows the fingers for the network nodes N1, N14, N21, N32 and N38 by way of example below the data network. The fingers are generally determined according to the identifier of the network node (e.g. 1 for the network node N1, 14 for the network node N14, 21 for the network node N21, etc.), plus $2^i$. The following finger table thus results for the network node N1: N1+1->8, N1+2->8, N1+4->8, N1+8->14, N1+16->21, N1+32->38. The fingers for the other network nodes are determined correspondingly.

If a resource with a popular checking value is searched for, all the network nodes respectively use their finger closest to the checking value of the resource. It is thus possible to respond to a search request in maximum 0(log m) steps, where m is the number of active network nodes in the data network. With conventional procedures all search enquiries for the checking value land on this network node, which may possibly fail due to the high number of requests and therefore does not allow other network nodes to find this table entry and it is also complex to restore the further stability of the data network in reality.

Figure 2:
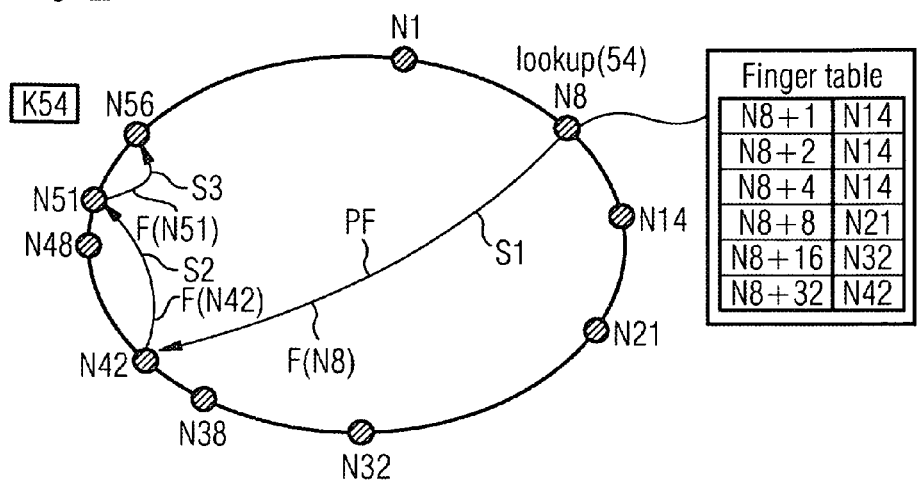
FIG. 2 shows a schematic diagram of the data network from FIG. 1, showing an exemplary request path.

FIG. 2 shows the creation of a request path TF in the data network described in FIG. 1 in more detail, forming the basis for the inventive method.

In the context of the present invention the concept of the checking path should be understood both as a publication path and a search path. It is assumed that the network node N8, whose finger table is shown once again for the purposes of illustration, wishes to publish a resource with the checking value K54. To this end the network node N8 goes through its finger table, which lists the network nodes active in the data network. For its publication request the network node N8 selects the one of its fingers F(N8) with the associated network node, whose identifier is closest to the searched for checking value K54. In this instance this is the network node N42. Since the network node N42 is not responsible for the table entry with the checking value K54, it, i.e. N42, forwards the publication request according to the same principle, until the responsible network node (N56) is found. For its publication request the network node N42 selects the one of its fingers F(N42) with the associated network node, whose identifier is closest to the checking value K54, in this instance the network node N51. N51 repeats the described procedure correspondingly. The request path is therefore N8-N42-N51-N56. To publish the resource with the checking value K54, the steps S1, S2, S3 are therefore required to reach the responsible network node N56.

In the event that the network node N8 does not publish the resource but wishes to search for the resource with the checking value K56, the request path PF corresponds to the path shown in FIG. 2, as in principle the network node with the corresponding identifier is searched for in distributed hash tables.

In the case of distributed hash tables it is observed that the request paths going out from different network nodes become increasingly similar in the last steps, as shown by way of example in FIG. 6. The reference character B indicates a region therein, which comprises the last steps of search requests of the network nodes N1, N8, N14 respectively. It can be seen that in the exemplary embodiment the network nodes N38, N42, N48 and N51 are contacted in addition to the network node N56 responsible for the checking value K54. This characteristic is utilized by back propagation and caching, in order to make better use of the defined structure of distributed hash tables.

In order to improve the stability of the data network in practice, the invention proposes the back propagation of popular checking values along the request path.

Figure 3:
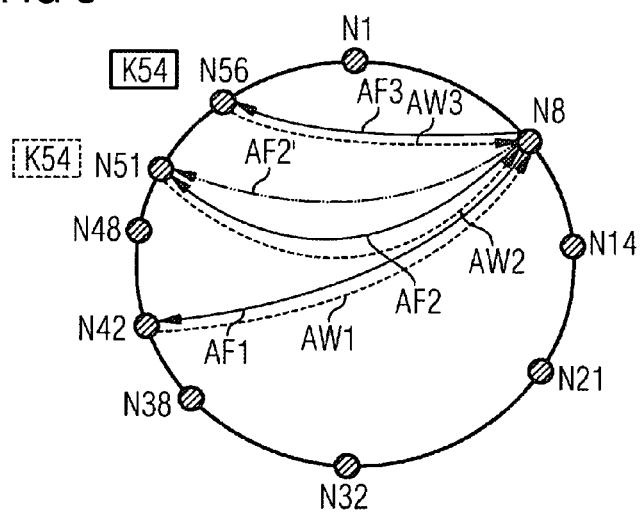
FIG. 3 shows a schematic diagram of the data network from FIG. 1, showing the exchange of messages for allocating a checking value to a network node.

In the exemplary embodiment according to FIG. 3 the network node N8 wishes to publish the resource with the checking value K56. To this end the network node N8 sends a request message AF1 to the network node N42, which represents the finger closest to the checking value K54. The network node N42 transmits a response message AW1 to the network node N8, to the effect that it does not (yet) manage a table entry with the checking value K54 and informs the network node N8 of its finger closest to the checking value K54. This is the network node N51, as described with reference to FIG. 2. The network node N8 contacts the network node N51 in the manner described, by sending a request message AF2 to the network node N51. N51 transmits a response message AW2 to the network node N8, responding to it that it does not manage any resource with the checking value K54 either and for its part specifying the finger closest to the checking value K54: N56. The network node N8 transmits a checking message AF3 to the network node N56. As a response message AW3 the network node N56 transmits to the network node N8 that it manages resources with the checking value K54 but has already exceeded a set threshold value. Transmission of the request message AF1 and response message AW1 is carried out in the context of step S1. The same applies to the request messages AF2 and AF3 and the response messages AW2 and AW3, which are exchanged in steps S2 and S3. The network node N8 then goes back a step and transmits a request message AF2' to the network node N51, to which it allocates the resource with the checking value K54. The network node N8 thus publishes the resource on the network node N51. Back propagation of the checking value K54 is shown with a broken outline. Should the network node N51 exceed its threshold value, e.g. if another network node also wishes to publish a resource with the checking value K54, a step further back on the relevant request path is published. This distributes the load for storing the resource with particularly popular checking values.

Figure 4:
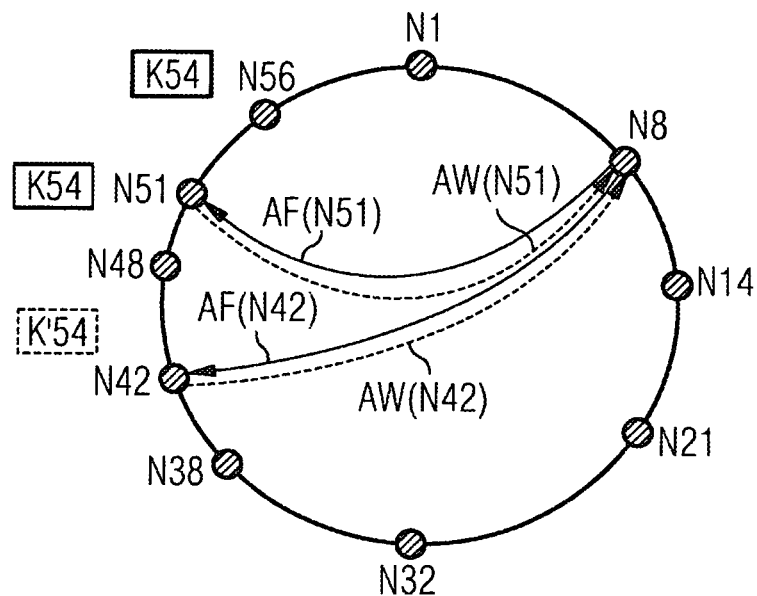
FIG. 4 shows a schematic diagram of the data network from FIG. 1, showing the principle of caching popular table entries along a request path.

FIG. 4 describes a further embodiment of the inventive method. In this popular resources, again with the checking value K54 in the exemplary embodiment, are stored (cached) along the request path PF. In the exemplary embodiment it is assumed that the network node N8 searches for a resource with the checking value K54. The closest finger (network node N42) to the checking value K54 sends a response message AW(N42) to the network node N8, in which it responds with its closest finger (N51). The checking value K54 has already been back propagated to the network node N51, as described above. This shortens the search path by one step. In this process the network node N8 contacts the network node N51, as also described above, by transmitting a request message AF(N51) to the network node N51. The network node N51 in turn responds with a response message AW(N51). A copy of the resource with the checking value K54 is also placed on the request path (shown as K'54 in the figure) so that the request path is further shortened for later requests. This distributes the load for responding to search requests.

Figure 5A:
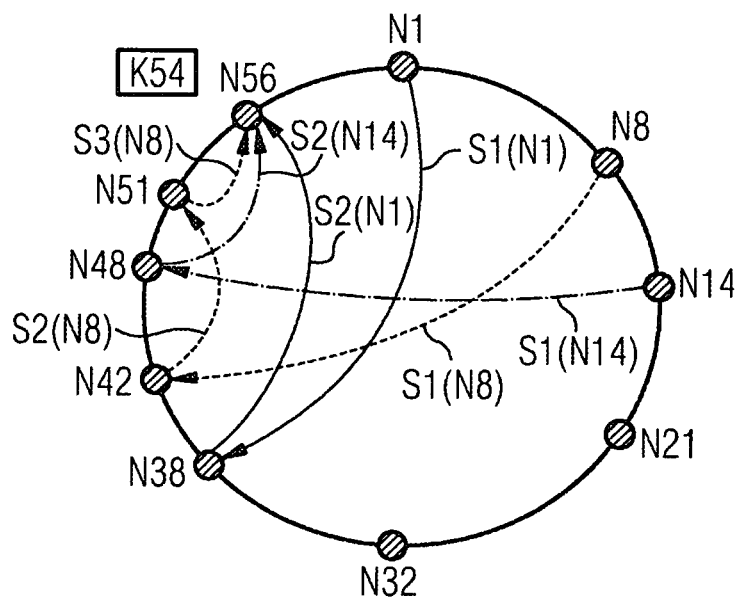
FIG. 5A shows a schematic diagram of the data network from FIG. 1, showing a number of search requests used to configure a tree structure.

In the exemplary embodiment in FIGS. 5A, 5B and 6 a predetermined period of validity of a resource, the so-called lease time, is also taken into account. The period of validity guarantees that a resource is removed from the data network again after the lease time has expired. To take into account the occurrence of holes on the request path, according to a first variant shown in FIGS. 5A, 5B, a tree structure is used, which is configured during back propagation. This is to allow network nodes, on which the period of validity of a resource expires, to maintain the tree structure of back propagation independently. During publication of the resource the publishing network node informs each network node on the path which network node it has previously requested. If the requested network node has reached its predetermined threshold value, it should know that the resource is now published on the network node in front of it on the request path. These network nodes represent so-called child nodes in the tree structure. If holes or gaps now appear in a segment, in which a table entry was back propagated, because the period of validity of the resource has expired on a network node or a new network node has been added, any network node in the request path can contact its respective predecessor, whether the table entry that has just expired or the one for which it is responsible is back propagated.

FIG. 5B shows an example of such a tree structure. The request paths with the destination checking value K54 from the network nodes N1, N8, N14 are as follows:
From N1: N38-N56
From N8: N42-N51-N56
From N14: N8-N56.

Going out from the network node N56 responsible for the checking value K54, from which backward propagation takes place on the request paths and which is understood to be the propagation root, the tree shown in FIG. 5B results. If for example the threshold value is set at one for the resource with the checking value K56 and it is also assumed that the network nodes N1, N8 and N14 publish this table entry in the data network, the first publication is allocated to the network node N56. Subsequent publications are allocated to the network nodes N51 and N48. The period of validity then expires first at the network node N56, resulting in a hole here. The knowledge that the network node N56 has about its child nodes N51, N48, N38 allows the network node N56 to move the information stored on one of the network nodes N58, N48 toward itself. This automatically fills the hole at the network node N56.

In another variant for avoiding holes in request paths the publishing network node notes during publication the number of steps after which it is published. In the example according to FIG. 3 the network node N56 responsible for the checking value K54 for example has reached its threshold value. Accordingly the resource is published on the network node in front of it in the request path and therefore after two steps. If the period of validity of the resource expires on the network node N51, the network node N8 publishes the resource, for example after 2+1 steps in its request path. This means that the network node N8 tries to publish the resource on the network node N56. If the threshold value is exceeded there, back propagation takes place, as described above. The reasons for the selection of 2+1 steps is that the period of validity of the resources always expires earlier toward the destination, in other words the network node N56 actually responsible, than on the network node in front of it in the request path. These are ultimately only used for back propagation, when network nodes close to the destination and the destination have reached their limits. This allows holes on the request path toward the destination to be filled.

The invention allows the load of requests for popular resources to be better distributed, with the characteristics of the data network being fully utilized. It is thus possible to utilize the method with churn as well, without the data network having to be extended for this purpose. The invention resolves both the load in respect of the storage of table entries and also the load in respect of request responses. This allows the load on individual networks, which would otherwise be susceptible to hot spot problems, to be reduced. It is also possible to reduce the load on the data network with so-called flash crowds. The term flash crowd refers to the phenomenon of sudden popularity of a specific checking value and the resulting request response for corresponding resources.

The invention claimed is:

1. A method for operating a network having a plurality of nodes, the nodes comprising a first node, a second node, a third node, and a fourth node, the first node being aware of a first subset of a topology of the network such that the first node knows less than all of the nodes of the network, the first subset comprising the second node, the second node being aware of a second subset of the topology of the network such that the second node knows less than all of the nodes of the network, the second subset comprising the third node, the third node being aware of a third subset of the topology of the network such that the third node knows less than all of the nodes of the network, the third subset comprising the fourth node, the method comprising:
    searching the first subset, by the first node, to identify an identifier of a node within the first subset that is closest to a checking value of a resource;
    determining, by the first node, that the identifier of the second node within the first subset is closest to the checking value;
    sending a first request, by the first node, to the second node to request publication of the resource;
    receiving, by the first node, a first response sent by the second node in response to the first request, the first response identifying the third node, the third node having an identifier that is closest to the checking value within the second subset;
    sending a second request, by the first node, to the third node to request publication of the resource, the second request being sent after the first node receives the first response;
    receiving, by the first node, a second response sent by the third node in response to the second request, the second response identifying the fourth node, the fourth node having an identifier within the third subset that is closest to the checking value;
    sending a third request, by the first node, to the fourth node to request publication of the resource, the third request being sent after the first node receives the second response;
    receiving, by the first node, a third response sent by the fourth node in response to the third request, the third response identifying the fourth node as having exceeded a threshold value for requests for publication of the resource;
    sending a fourth request, by the first node, to the third node, the fourth request being sent after the first node receives the third response, the fourth request allocating the resource to the third node to publish the resource to the third node.

2. The method of claim 1, comprising:
    initiating back propagation of the checking value by the first node.

3. The method of claim 2, comprising:
    sending a fourth response message, by the third node, to the first node, the fourth response message placing a copy of the resource and the checking value on a request path to distribute a load for responding to search requests for the resource.

4. The method of claim 1, comprising:
    determining, by the second node, that the second subset does not include the checking value in response to receiving the first request and prior to sending the first response; and
    determining, by the third node, that the third subset does not include the checking value in response to receiving the second request and prior to sending the second response.

5. The method of claim 1, wherein the resource has a predetermined period of validity, the method comprising:
    initiating back propagation of the checking value in response to the fourth response, wherein a tree structure is configured during the back propagation to permit the tree structure to be maintained independently by the nodes along a request path associated with the resource.

6. The method of claim 1, wherein a request path for the resource is defined by the sending of the first, second, third, and fourth requests and the first, second, and third responses.

7. The method of claim 6, wherein
    during publication of the resource, the first node informing the third node of the second node as being a node that the first node previously requested publication for the resource.

8. The method of claim 1, wherein the network is a decentralized data network.

9. The method of claim 1, wherein the checking value is assigned to the identifier of the fifth node in a value table of the network.

10. The method of claim 9, wherein the value table is a distributed hash table.

11. The method of claim 10, wherein the resource is a data file.

12. The method of claim 10, wherein the resource is a reference to a storage location of data in the network.

13. A network comprising:
    a plurality of nodes that are communicatively connectable, the nodes comprising a first node, a second node, a third node, and a fourth node;
    the first node being aware of a first subset of a topology of the network, the first subset comprising the second node;
    the second node being aware of a second subset of the topology of the network, the second subset comprising the third node;
    the third node being aware of a third subset of the topology of the network, the third subset comprising the fourth node;
    the first node searching the first subset to identify an identifier of a node within the first subset that is closest to a checking value for a resource and determining that an identifier of the second node within the first subset is closest to the checking value;
    the first node sending a first request to the second node to request publication of the resource;

the second node searching the second subset to identify an identifier of a node within the second subset that is closest to the checking value in response to the first request and determining that an identifier of the third node within the second subset is closest to the checking value, the second node sending a first response to the first node that identifies the third node, the first node receiving the first response from the second node;

the first node sending a second request to the third node to request publication of the resource, the second request being sent after the first node receives the first response;

the third node searching the third subset to identify an identifier of a node within the third subset that is closest to the checking value in response to the second request and determining that the identifier of the fourth node within the third subset is closest to the checking value and the third node sending a second response to the first node that identifies the fourth node;

the first node receiving the second response;

the first node sending a third request to the fourth node to request publication of the resource, the third request being sent after the first node receives the second response;

the first node receiving a third response sent by the fourth node in response to the third request, the third response identifying the fourth node as having exceeded a threshold value for requests for publication of the resource;

the first node sending a fourth request to the third node, the fourth request being sent after the first node receives the third response, the fourth request allocating the resource to the third node to publish the resource to the third node.

14. The network of claim 13, wherein the first node initiates back propagation of the checking value.

15. The network of claim 13, wherein the third nodes sends a fourth response message to the first node that places a copy of the resource and the checking value on a request path to distribute a load for responding to search requests for the resource.

16. The network of claim 13, wherein the second node determines that the second subset does not include the checking value in response to receiving the first request and prior to sending the first response; and
the third node determines that the third subset does not include the checking value in response to receiving the second request and prior to sending the second response.

17. The network of claim 13, wherein the resource has a predetermined period of validity, and wherein back propagation of the checking value is initiated in response to the fourth request, a tree structure being configured during the back propagation to permit the tree structure to be maintained independently by the nodes along a request path associated with the resource.

18. The network of claim 13 wherein a request path for the resource is defined by the sending of the first, second, third, and fourth requests and the first, second, and third responses.

19. The network of claim 13, wherein the network is a decentralized data network and the checking value is assigned to the identifier of the fourth node in a value table of the network; and
wherein the checking value is greater than a value of the identifier of the second node, the checking value is greater than a value of the identifier of the third node, and the checking value is greater than a value of the identifier of the fourth node.

20. A communication system comprising:

a plurality of nodes that are communicatively connectable, the nodes comprising a first node, a second node, a third node, and a fourth node;

the first node being aware of a first subset of a topology of the network, the first subset comprising the second node;

the second node being aware of a second subset of the topology of the network, the second subset comprising the third node;

the third node being aware of a third subset of the topology of the network, the third subset comprising the fourth node;

the first node configured to search the first subset to identify an identifier of a node within the first subset that is closest to a checking value for a resource and determine that an identifier of the second node within the first subset is closest to the checking value;

the first node configured to send a first request to the second node to request publication of the resource;

the second node configured to search the second subset to identify an identifier of a node within the second subset that is closest to the checking value in response to the first request and determine that an identifier of the third node within the second subset is closest to the checking value, the second node configured to send a first response to the first node that identifies the third node based on search results of the search of the second subset, the first node configured to receive the first response from the second node;

the first node configured to send a second request to the third node to request publication of the resource, the second request to be sent after the first node receives the first response;

the third node configured to search the third subset to identify an identifier of a node within the third subset that is closest to the checking value in response to the second request and determine that the identifier of the fourth node within the third subset is closest to the checking value and the third node configured to send a second response to the first node that identifies the fourth node;

the first node configured to receive the second response;

the first node configured to send a third request to the fourth node to request publication of the resource, the third request to be sent after the first node receives the second response;

the first node configured to receive a third response sent by the fourth node in response to the third request, the third response identifying the fourth node as having exceeded a threshold value for requests for publication of the resource;

the first node configured to send a fourth request to the third node, the fourth request to be sent after the first node receives the third response, the fourth request allocating the resource to the third node to publish the resource to the third node.

* * * * *